United States Patent [19]

Fenderson et al.

[11] 4,376,309

[45] Mar. 8, 1983

[54] METHOD AND APPARATUS FOR SIGNAL-EYE TRACKING IN DIGITAL TRANSMISSION SYSTEMS

[75] Inventors: Gerald L. Fenderson, Newton; Mitchell A. Skinner, Seabrook, both of N.H.

[73] Assignee: Bell Telephone Laboratories, Incorporated, Murray Hill, N.J.

[21] Appl. No.: 268,274

[22] Filed: May 29, 1981

[51] Int. Cl.$^3$ .............................................. H04L 7/04
[52] U.S. Cl. ..................... 375/101; 375/110; 375/120; 328/162
[58] Field of Search ............ 375/4, 10, 99, 101, 375/102, 100, 106; 328/151, 162–164, 188; 371/5, 61, 64; 178/69 A, 69 M; 324/57 N

[56] References Cited

U.S. PATENT DOCUMENTS

| | | | |
|---|---|---|---|
| 3,041,540 | 6/1962 | Favin | 328/14 |
| 3,057,957 | 10/1962 | Gibby et al. | 178/69 |
| 3,213,196 | 10/1965 | Tuck | 178/69 A |
| 3,404,232 | 10/1968 | Burford | 178/70 |
| 3,506,918 | 4/1970 | Perreault | 375/10 |
| 3,534,273 | 10/1970 | Thomas | 328/162 |
| 3,550,021 | 10/1968 | Freeny | 178/69 A |
| 3,721,959 | 3/1973 | George | 375/100 |
| 3,864,529 | 2/1975 | Tracey et al. | 328/151 |
| 4,053,723 | 11/1977 | Arras | 178/69 A |
| 4,327,356 | 4/1982 | Gilliland | 375/4 |

Primary Examiner—Benedict V. Safourek
Assistant Examiner—Stephen Chin
Attorney, Agent, or Firm—David R. Padnes

[57] ABSTRACT

An improvement in tracking the signal-eyes (FIG. 4) formed by a digital signal is disclosed. This improvement is achieved by forming a sample at a regeneration sampling time (e.g., 404), a first sampling time (e.g., 401) and a second sampling time (e.g., 402). The first and second sampling times respectively precede and succeed the signal-eyes while each regeneration sampling time occurs within the signal-eyes. The amplitude of each sample represents the amplitude of the digital signal at the sampling time relative to a reference level (e.g., 301, 302 or 303) which passes through one of the signal-eyes. A first comparison signal is generated by comparing the amplitudes of the samples at the regeneration and adjacent first sampling times. Similarly, a second comparison signal is generated by comparing the amplitudes of the samples at the regeneration and adjacent second sampling times. The difference between the first and second comparison signal is then averaged to form an error signal. The error signal varies with movement of the signal-eyes relative to the regeneration sampling time. In one embodiment (FIG. 2) of the invention, this error signal is used to align the regeneration sampling time with a predetermined position within the signal-eyes.

14 Claims, 6 Drawing Figures

METHOD AND APPARATUS FOR SIGNAL-EYE TRACKING IN DIGITAL TRANSMISSION SYSTEMS

TECHNICAL FIELD

The present invention relates to digital transmission systems and, more particularly, to a method and apparatus for tracking the timing of the signal-eyes.

BACKGROUND OF THE INVENTION

The use of digital transmission systems requires the ability to reconstruct the transmitted digital signal after it has traveled through a noisy, dispersive medium. Signal reconstruction entails forming samples of the received digital signal at discrete times. The amplitude of each sample indicates whether the amplitude of the digital signal at the sample time is greater or less than some decision threshold.

In certain digital transmission systems, such as coaxial cable, the transmission medium is well-controlled and only slight signal delay and distortion occurs. Accordingly, the received digital signal can be regenerated with an acceptable error rate using fixed sampling times. In other digital transmission systems, however, such as those utilizing radio links, the signal distortion and delay introduced in transmission is uncontrollable and often unpredictable. Signal regeneration in such systems using fixed sampling times results in an unacceptable error rate for telecommunications applications.

It is well-known that regeneration errors can be reduced if the sampling times coincide with the so-called "signal-eyes" of changing dimensions and positions. Such signal-eyes are defined by the ensemble of all signal waveforms over the baud interval. Moreover, regeneration errors can generally be reduced even further by the alignment of the sampling times with a predetermined position within the signal-eyes. This predetermined position is typically at the signal-eye center.

Various techniques have been used to track the signal-eyes and vary the sampling times. For example, in U.S. Pat. No. 3,534,273 to Thomas, issued Oct. 13, 1970, a recursive technique, requiring rather elaborate circuitry, is utilized to continually monitor the signal-eye boundaries. Once the boundaries are determined, the sampling times are adjusted to coincide with the center of the signal-eyes. Another eye tracking technique (See U.S. Pat. No. 3,404,232 to Burford, issued Oct. 1, 1968) compares a sample of the digital signal taken at a primary with samples taken at secondary sampling times. All sampling times occur within the signal-eyes with the secondary sampling times straddling the primary sampling time. If the amplitude of each sample relative to a common decision threshold is not the same, a corrective signal is generated which shifts all the sampling times by a time interval which aligns the primary sampling times with the signal-eye centers. The problem with this technique, however, is that no corrective signal is generated for small shifts in the signal-eye position. As a result, the error rate increases to a level which is unacceptable for many telecommunications applications.

SUMMARY OF THE INVENTION

In accordance with the present invention, an improvement in tracking the timing of the signal-eyes is achieved. This improvement is accomplished by forming a sample of the digital signal at a first sampling time, a regeneration sampling time and a second sampling time. The amplitude of each sample indicates the amplitude of the digital signal at the sample time relative to a reference level. This reference level passes through one of the signal-eyes. The regeneration sampling time occurs within the signal-eyes. In contrast to prior techniques, the first and second sampling times respectively precede and succeed the signal-eyes. The amplitude of the sample obtained at the first sampling time is compared with the amplitude of the sample obtained at the regeneration sampling time to generate a first comparison signal. A second comparison signal is generated by comparing the sample amplitude at the regeneration sampling time with the sample amplitude at the second sampling time. The difference between the first and second comparison signals is then averaged to form an error signal. This error signal varies with the movement of the signal-eyes relative to the regeneration sampling time.

It is an aspect of the present invention that the generated error signal can be coupled to apparatus which aligns the regeneration sampling time with a predetermined position within the signal-eyes.

A further aspect of the present invention is its applicability to any digital system having two or more signal levels.

DETAILED DESCRIPTION

Figure 1:
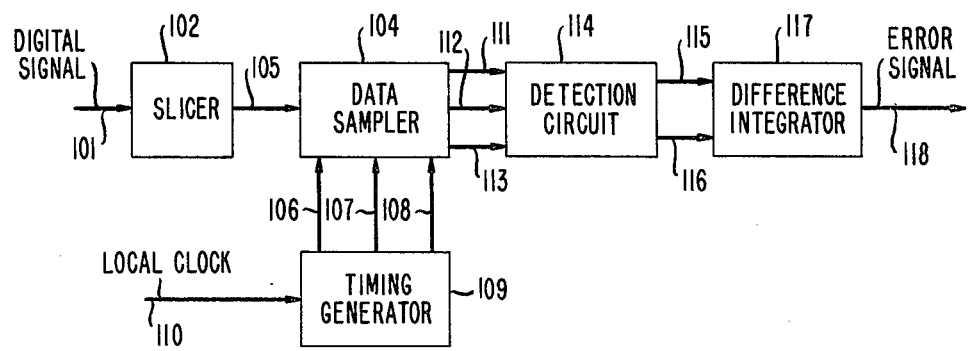
FIG. 1 is a block diagram of one embodiment of the present invention.
Figure 3:
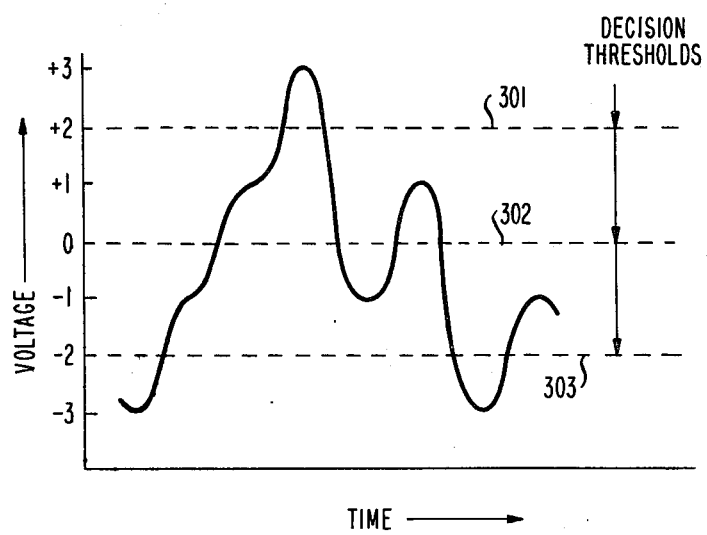
FIG. 3 illustrates a typical quaternary digital signal.

Referring to FIG. 1, a digital signal is coupling on input lead 101 to slicer 102. The digital signal, for purposes of illustration, is a quaternary signal. FIG. 3 shows a typical quaternary signal consisting of four possible coded levels, i.e., $\pm 1$ and $\pm 3$ volts. To distinguish between these four possible coded levels, it is necessary to establish three decision thresholds, referred as 301, 302 and 303, in FIG. 3. It should, of course, be understood that the present invention is not limited to quaternary signals but can be used with any digital signal, (e.g. voice, video, facsimile, and etc.,) having two or more coded levels.

Returning to FIG. 1 slicer 102 senses the amplitude of the quaternary signal with respect to a reference level and generates an output signal therefrom. The reference level used is typically aligned with one of the decision thresholds shown in FIG. 3. For purposes of the following discussion, the reference level used by slicer 102 is aligned with the center decision threshold 302. Slicer 102 when referenced to decision threshold 302 is commonly referred to as a center eye slicer.

The output signal from slicer 102 has one of two amplitudes. If the amplitude of the digital input signal is greater than the reference level, slicer 102 generates a high or "logical 1" signal level. If, on the other hand, the amplitude of the digital input signal is less than the reference level, a low or "logical 0" signal level is generated.

The output signal from slicer 102 is coupled to data sampler 104 via lead 105. Data sampler 104 samples the slicer output signal at first, regeneration and second sampling times. These three sampling times are controlled by three timing signals. Timing generator 109 produces these timing signals from a local clock signal supplied on lead 110. The three timing signals, referred to as the first, regeneration and second timing signals to indicate the sampling times each controls, are coupled through leads 106, 107 and 108 to data sampler 104.

Figure 4:
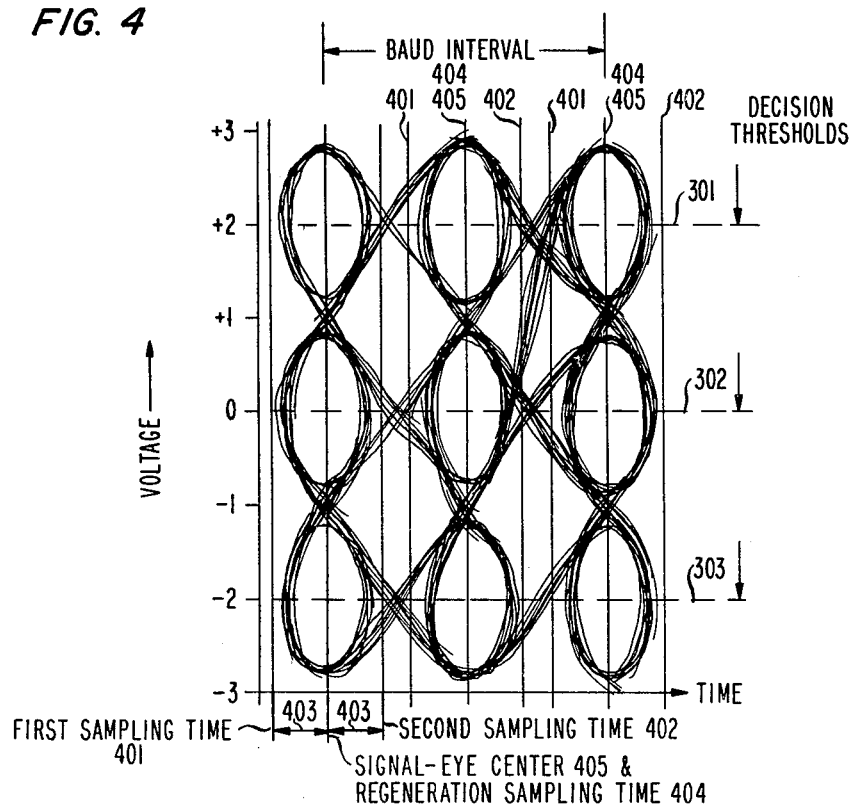
FIG. 4 illustrates typical signal-eyes produced by the quaternary digital signal of FIG. 3.

The first, regeneration and second sampling times occur in a specific order and time relationship relative to digital input signal. To understand this relationship, reference is made to FIG. 4. FIG. 4 illustrates the so-called signal-eyes of the quaternary signal shown in FIG. 3. Such signal-eyes are defined by the ensemble of all possible digital coded signals over the baud interval. The illustrated signal-eye pattern would result if a portion of the quaternary signal of FIG. 3 was displayed on the face of a long persistence cathode ray oscilloscope. The signal-eye distortions are somewhat exaggerated here for illustrative purposes. For the assumed quaternary signal, a series of three vertically disposed signal-eyes would result. It will be clear to those skilled in the art that the signal-eyes are not static or stationary, but rather change their position in the voltage-time domain.

Ideally, each regeneration sampling time, line 404 in FIG. 4, coincides with a predetermined position (line 405) within the signal-eyes. The predetermined position is generally one which yields minimum signal regeneration errors and is, therefore, the optimum sampling position. Typically, such a position is the signal-eye center. The first and second sampling times, however, respectively precede and succeed the signal-eyes and are referenced as lines 401 and 402. Preferably, the first and second sampling times are also symmetrically disposed about the signal-eye center 405. In FIG. 4, the time interval between the signal-eye center and the first and second sampling times is referenced as 403.

Turning back to FIG. 1, samples of slicer output 102 obtained at the first, regeneration and second sampling times are coupled by leads 111, 112 and 113 to detection circuit 114. Detection circuit 114 forms first and second comparisons from the received samples. In the first comparison, the amplitude of a sample obtained at a first sampling time is compared with the amplitude of a sample at the adjacent regeneration sampling time. If the amplitudes of these signal samples are not the same, a specific signal is generated on lead 116. In a similar fashion, a second comparison of the amplitudes of samples obtained using the regeneration and adjacent second sampling times is made. If the amplitudes of the samples examined in the second comparison are not the same, a specific signal is generated on lead 115. The difference between the signals on leads 115 is 116 are then averaged by difference integrator 117 to form an error signal on lead 118.

Figure 5:
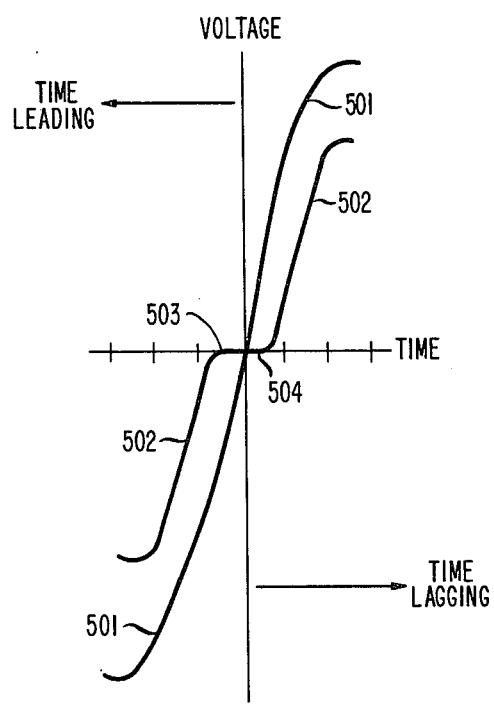
FIG. 5 is a comparison of the error signals produced by the present invention vis-a-vis prior art apparatus.

Curve 501 in FIG. 5 illustrates the error signal on lead 118 generated as the signal-eye center in FIG. 4 moves relative to the regeneration sampling time. The signal-eye center in FIG. 5 is at the origin. A positive error signal voltage indicates the regeneration sampling time 405 lags the signal-eye center position 404 in time. This is due to a decrease in signal delay through the digital transmission system. Similarly, a negative error signal voltage indicates an increase in signal delay which causes the regeneration sampling time 405 to precede the signal-eye center position 404 in time. It is important to note that curve 501 is monotonic through the origin. In contrast, the previously described technique in U.S. Pat. No. 3,404,232 to Burford provides an error signal represented by curve 502. Curve 502 is "uni-valued" over a time interval about the origin. This time interval falls between reference points 503 and 504. Accordingly, a variation in the regeneration sampling times relative to the signal-eye center position is undetectable if this variation falls within the time interval between points 503 and 504. Such variation increases the error rate to a level which is unacceptable for many telecommunications applications.

Figure 2:
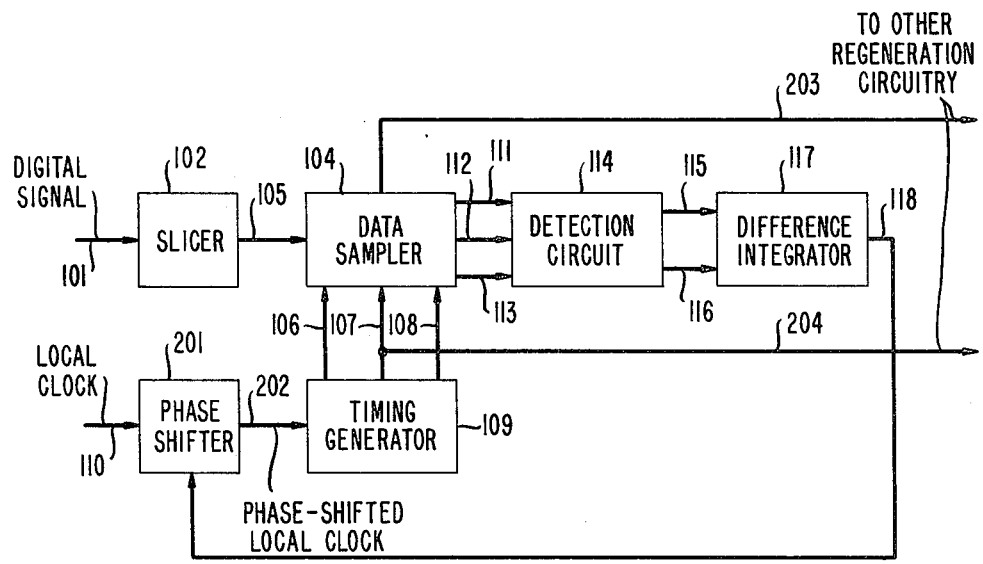
FIG. 2 is a block diagram of a second embodiment of the present invention.

While the above-described error signal provided in FIG. 1 is useful in the testing and analysis of digital system performance, the error signal can also be coupled to additional circuitry to provide automatic alignment of each regeneration sampling time with each signal-eye center. FIG. 2 illustrates one such scheme in which phase shifter 201 receives the error signal on lead 118 along with the local clock on lead 110. Phase shifter 201 varies the phase of the local clock in response to the error signal.

This phase-shifted local clock is coupled on lead 202 to timing generator 109. The phase of the first, regeneration and second timing signals produced by timing generator 109 varies with the phase-shifted local clock. As a result, each regeneration sampling time 405 is maintained in alignment with each signal-eye center 404.

Each sample obtained at the regeneration sampling time is coupled from data sampler 104 on lead 203 to other well-known regeneration circuitry. This circuitry reconstructs the illustrative quaternary signal by logically combining the samples on lead 203 with samples of the outputs of two other slicers (not shown) referenced to decision thresholds 301 and 303. The output of these slicers is sampled using the regeneration timing signal on lead 107.

Figure 6:
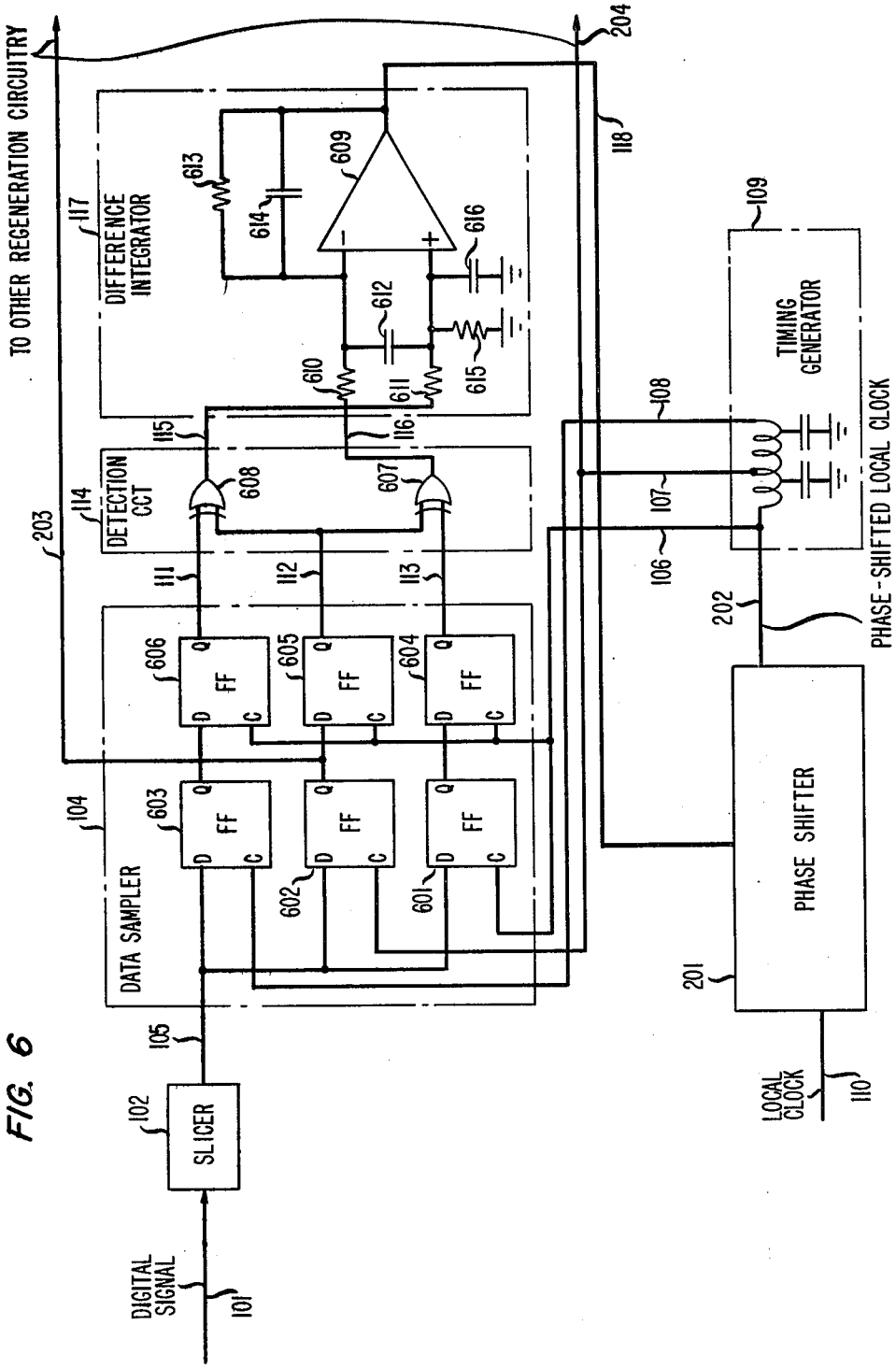
FIG. 6 is a detailed schematic diagram of FIG. 2.

Refer now to FIG. 6. While FIG. 6 is a detailed schematic diagram of FIG. 2, the circuitry disclosed is identical to their counterparts in FIG. 1 with the exception of phase shifter 201 and output leads 203 and 204 which are not used in FIG. 1. Slicer 102 can be realized by a variety of well-known circuits. One such circuit is disclosed in a pending U.S. application Ser. No. 127,936, filed Mar. 7, 1980 which is assigned to the present assignee and incorporated herein by reference. The disclosed circuitry is particularly beneficial as it maintains the position of the slicer reference level relative to the signal-eye. Without such alignment, regeneration errors occur which are significant in systems wherein noise causes considerable variation in the received digital signal levels relative to the transmitted digital signal levels.

Data sampler 104 comprises positive-edge-triggered D-type flip-flops 601, 602, 603, 604, 605 and 606. The output of slicer 102 is coupled to the D lead of flip-flops 601, 602 and 603. The clock leads C of flip-flop 601, 602 and 603 are respectively coupled to the first, regeneration and second timing signals via leads 106, 107 and 108. Upon the positive-edge transition of each timing signal, the slicer output signal on lead 105 is toggled from the D leads of flip-flops 603, 602 and 601 to their respective Q outputs. The Q outputs of flip-flops 601, 602 and 603 are respectively connected to the D inputs of flip-flop 604, 605 and 606. The clock leads C of flip-flops 604, 605 and 606 are all coupled to first timing signal on lead 106. Consequently, on the positive-edge transition of the first timing signal the samples stored in flip-flops 601, 602 and 603 are transferred to the Q outputs of flip-flop 604, 605 and 606. Since the sampling process is a continuous one, the response time of flip-flops 604, 605 and 606, i.e., the time required to toggle the information from the D to the Q leads is faster than the response time of flip-flops 601, 602 and 603.

Detector circuit 114 comprises exclusive-OR gates 607 and 608. Exclusive-OR gate 607 compares samples of the output of slicer 102 at the first and regeneration sampling times by examining the Q outputs of flip-flops 604 and 605. If the Q outputs of flip-flops 604 and 605 are different, a high level or "logical 1" output signal is generated on lead 116. However, if the Q outputs of flip-flops 604 and 605 are the same a low level or "logical 0" signal is generated on lead 116. Exclusive-OR gate 608 compares samples of the output of slicer 102 at the regeneration and second sampling times by examining the Q outputs of flip-flops 605 and 606. If the Q outputs of flip-flops 605 and 606 are different, a high or "logical 1" output signal is generated on lead 115. Similarly, if the Q outputs of flip-flops 605 and 606 are the same, a low level or logical 0 signal is generated on lead 115.

Difference integrator 117 comprises difference amplifier 609, resistors 610, 611, 613 and 615 and capacitors 612, 614 and 616. Leads 115 and 116 are respectively coupled to the positive and negative inputs of difference amplifier 609. Accordingly, amplifier 609 integrates the difference between the signals on leads 115 and 116. The time constant of integrator 117 can be adjusted by the selection of the values of capacitors 614, 616 and resistors 613 and 615. The gain provided by difference integrator 117 is the same for both the positive and negative inputs and is controlled by the value of the ratio of resistor 613/resistor 610 and the value of the ratio of resistor 615/resistor 611. Resistors 610, 611 and capacitor 612 forms a high frequency filter that filters signal frequencies beyond the range of difference amplifier 609.

Statistically, the difference between the signal levels on leads 115 and 116 is zero if the regeneration sampling time is aligned with the corresponding signal-eye center. However, if less signal delay is introduced, the average signal level on lead 115 is more than the average signal level on lead 116 thereby producing a positive error signal. In similar fashion, a negative error signal is generated by a higher average signal level on lead 116 than on lead 115.

Phase shifter 201 comprises a well-known voltage-controlled phase shifter, wherein the phase of the local clock on lead 110 is varied in response to the error signal on lead 118.

Timing generator 109 can be realized using a conventional delay line. Lead 106, 107 and 108 are each connected to one of three evenly-spaced taps on the delay line.

While the principles of the present invention have been discussed with reference to a quaternary digital input signal, it should be understood that the principles are applicable to any digital signal having two or more signal levels. Moreover, the principles are not limited to the embodiments discussed. For example, while the regeneration sampling times are typically nominally aligned with the center of the signal-eyes, the variation of these sampling times relative to any predetermined position within the signal-eyes and the alignment of regeneration sampling times thereto can be easily accomplished by coupling lead 107 to another tap on the delay line within timing generator 109. Moreover, while in the above discussion the amplitude of the digital input signal is first sensed by slicer 102 and then sampled by data sampler 104, the order of these operations can be reversed. For example, the digital input signal can be supplied first to sample and hold circuitry. The amplitude of the sample held could then be determined by a number of techniques, such as successive approximation. Finally, in some cases, the need for slicer 102 can be eliminated by choosing the components of data sampler 104 to selectively trigger on the specific range of the incoming digital signal levels.

What is claimed is:

1. Apparatus for use in a digital transmission system wherein the digital signal has n signal levels which form n−1 aligned signal-eyes, where n has an integer value of at least 2, said apparatus characterized by means (e.g., 102, 104, 109) for forming first samples, regeneration samples and second samples of the digital signal, each regeneration sample is formed at a regeneration sampling time which occurs within said signal-eyes, each of said first samples is formed at a first sampling time which precedes said signal-eyes and one of said regeneration samples, each of said second samples is formed at a second sampling time which succeeds said signal-eyes and said one of said regeneration samples, each of said first, regeneration and second samples having an amplitude that represents the amplitude of the digital signal at the respective sampling time relative to a reference level which passes through one of said signal-eyes, detection circuit means (e.g., 604, 605, 607) for comparing the amplitude of each of said first samples with the amplitude of said one of said regeneration samples and generating a first comparison signal therefrom, detection circuit means (e.g., 605, 606, 608) for comparing the amplitude of each of said second samples with the amplitude of said one of said regeneration samples and generating a second comparison signal therefrom, said first and second comparison signals having a difference therebetween, and means (e.g., 117) for averaging the difference between said first and second comparison signals to form an error signal which varies with the movement of said signal-eyes relative to said regeneration sampling time.

2. The apparatus of claim 1 wherein said reference level passes through the center of said one of said signal-eyes.

3. The apparatus of claim 2 wherein said first and said second sampling times are symmetrically disposed about said signal-eyes.

4. Apparatus for use in a digital transmission system wherein the digital signal has n signal levels which form n−1 aligned signal-eyes, where n has an integer value of at least two, said apparatus characterized by
BY means (e.g., 102, 104, 109) for forming first samples, regeneration samples and second samples of the digital signal, each regeneration sample is formed at a regeneration sampling time which occurs within said signal-eyes, each of said first samples is formed at a first sampling time which precedes said signal-eyes and one of said regeneration samples, each of said second samples is formed at a second sampling time which succeeds said signal-eyes and said one of said regeneration samples, each of said first, regeneration and second samples having an amplitude that represents the amplitude of the digital signal at the respective sampling time relative to a reference level which passes through one of said signal-eyes, detection circuit means (e.g., 604, 605 and 607) for comparing the amplitude of each of said first samples with the amplitude of said one of said regeneration samples and generating a first comparison signal therefrom, detection circuit means (e.g., 605, 606 and 608) for comparing the amplitude of each of said second samples with the amplitude of said one of said regeneration samples and generating a second comparison signal therefrom, said first and second comparison signals having a difference therebetween, means (e.g., 117) for averaging the difference between said first and said second comparison signals to form an error signal, and means (e.g., 201) responsive to said error signal for aligning said regeneration sampling time with a predetermined position within said signal-eyes.

5. The apparatus of claim 4 wherein said reference level passes through the center of said one of said signal-eyes.

6. The apparatus of claim 5 wherein said predetermined position is the center of said signal-eyes.

7. The apparatus of claim 6 wherein the first and second sampling times are symmetrically disposed about said signal-eyes.

8. A method of tracking in time the n−1 aligned signal-eyes formed by n signal levels of a digital signal, where n has an integer value of at least two, characterized by the steps of forming (e.g., 102, 104, 109) first samples, regeneration samples and second samples of the digital signal, each regeneration sample is formed at a regeneration sampling time which occurs within said signal-eyes, each of said first samples is formed at a first sampling time which precedes said signal-eyes and one of said regeneration samples, each of said second samples is formed at a second sampling time which succeeds said signal-eyes and said one of said regeneration samples, each of said first, regeneration and second samples having an amplitude that represents the amplitude of the digital signal at the respective sampling time relative to a reference level which passes through one of said signal-eyes, comparing (e.g., 604, 605, 607) the amplitude of each of said first samples with the amplitude of said one of said regeneration samples and generating a first comparison signal therefrom, comparing (e.g., 605, 606, 608) the amplitude of each of said second samples with the amplitude of said one of said regeneration samples and generating a second comparison signal therefrom, said first and second comparison signals having a difference therebetween, and averaging (e.g., 117) the difference between said first and said second comparison signals to form an error signal which varies with the movement of said signal-eyes relative to said regeneration sampling time.

9. The method of claim 8 wherein said reference level passes through the center of said one of said signal-eyes.

10. The method of claim 9 wherein the first and second sampling times are symmetrically disposed about said signal-eyes.

11. A method of generating an adaptive timing signal for use in regenerating a digital signal having n signal levels which form a series of n−1 signal-eyes in time, where n has an integer value of at least 2, characterized by the steps of forming (e.g., 102, 104, 109) first samples, regeneration samples and second samples of the digital signal, each regeneration sample is formed at a regeneration sampling time which occures within said signal-eyes, each of said first samples is formed at a first sampling time which precedes said signal-eyes and one of said regeneration samples, each of said second samples is formed at a second sampling time which succeeds said signal-eyes and said one of said regeneration samples, each of said first, regeneration and second samples having an amplitude that represents the amplitude of the digital signal at the respective sampling time relative to a reference level which passes through one of said signal-eyes, comparing (e.g., 604, 605, 607) the amplitude of each of said first samples with the amplitude of said one of said regeneration samples and generating a first comparison signal therefrom, comparing (e.g., 605, 606, 608) the amplitude of each of said second samples with the amplitude of said one of said regeneration samples and generating a second comparison signal therefrom, said first and second comparison signals having a difference therebetween, averaging (e.g., 117) the difference between said first and said second comparison signals to form an error signal, and varying said regeneration sampling time in response to said error signal to align said regeneration sampling time with a predetermined position within said signal-eyes.

12. The method of claim 11 wherein said reference level passes through the center of said one of said signal-eyes.

13. The method of claim 12 wherein said predetermined position is the center of said signal-eyes.

14. The method of claim 13 wherein said first and said second sampling time are symmetrically disposed about said signal-eyes.

* * * * *